United States Patent
Garabello et al.

(10) Patent No.: US 8,091,447 B2
(45) Date of Patent: Jan. 10, 2012

(54) SEQUENTIAL CONTROL DEVICE WITH ROTATING DRUM FOR ENGAGING GEARS IN A MECHANICAL GEARBOX OF A MOTOR VEHICLE

(75) Inventors: Marco Garabello, Orbassano (IT); Andrea Piazza, Orbassano (IT); Gianluigi Pregnolato, Orbassano (IT)

(73) Assignee: C.R.F. Societa' Consortile per Azioni, Orbassano (Torino) (IT)

( * ) Notice: Subject to any disclaimer, the term of this patent is extended or adjusted under 35 U.S.C. 154(b) by 177 days.

(21) Appl. No.: 12/498,779

(22) Filed: Jul. 7, 2009

(65) Prior Publication Data

US 2010/0005917 A1  Jan. 14, 2010

(30) Foreign Application Priority Data

Jul. 10, 2008  (EP) .................................. 08425471

(51) Int. Cl.
*B60K 20/00*  (2006.01)
(52) U.S. Cl. .................. 74/473.36; 74/473.1; 74/473.37
(58) Field of Classification Search ................. 74/473.1, 74/473.36, 473.37, 567
See application file for complete search history.

(56) References Cited

U.S. PATENT DOCUMENTS

| | | | |
|---|---|---|---|
| 5,297,453 A * | 3/1994 | Chene | 74/473.24 |
| 5,743,147 A * | 4/1998 | Gazyakan | 74/473.25 |
| 5,862,705 A | 1/1999 | Lee | |
| 5,863,270 A * | 1/1999 | Chen et al. | 475/289 |
| 6,835,157 B2 * | 12/2004 | Haka | 475/269 |
| 6,873,472 B2 * | 3/2005 | Suzuki | 359/699 |
| 7,363,834 B2 * | 4/2008 | Kapp et al. | 74/337.5 |

FOREIGN PATENT DOCUMENTS

| | | |
|---|---|---|
| DE | 102 59 485 A1 | 7/2004 |
| EP | 1 072 823 A1 | 1/2001 |
| FR | 982 529 A | 6/1951 |
| FR | 2 105 200 A3 | 4/1972 |
| GB | 208370 A | 12/1923 |

* cited by examiner

*Primary Examiner* — Richard W Ridley
*Assistant Examiner* — Matthew A Johnson
(74) *Attorney, Agent, or Firm* — Sughrue Mion, PLLC

(57) ABSTRACT

A sequential control device having a rotatable drum and having a plurality of guide grooves and a corresponding plurality of engagement forks, each including a supporting portion on the outer surface of the drum, a drive portion to drive a corresponding synchronizing sleeve of the gearbox, and a pin engaging in a corresponding guide groove of the drum. The guide grooves are shaped to produce selective axial movement of the pins and engagement forks, upon rotation of the drum, to cause each time the engagement of a given gear. The pins are positioned on the same side of the drive portion of the engagement forks. A through groove is provided on the outer surface of the drum and extends from an end of the drum to at least the guide groove farthest from that end, to guide the pins of the engagement forks when mounted on the drum.

5 Claims, 3 Drawing Sheets

SEQUENTIAL CONTROL DEVICE WITH ROTATING DRUM FOR ENGAGING GEARS IN A MECHANICAL GEARBOX OF A MOTOR VEHICLE

BACKGROUND OF THE INVENTION

The present invention relates to a sequential control device with rotating drum for engaging gears in a mechanical gearbox of a motor vehicle, particularly of a motor car.

Mechanical gearboxes used in motor vehicles are generally of the type with permanently engaged gears, i.e. of the type in which driving gear wheels carried by one or more primary shafts, or input shafts, permanently mesh with corresponding driven gear wheels carried by one or more secondary shafts, or output shafts, and in which the driving gear wheels are rigidly connected for rotation with the primary shaft (or primary shafts) while the driven gear wheels are mounted idly on the secondary shaft (or secondary shafts). A gear is engaged by coupling the idle gear wheel of the gear train corresponding to the gear to be engaged for rotation with the corresponding shaft. For this purpose, each idle gear wheel, or each pair of adjacent idle gear wheels, is associated with a synchronizing device serving to synchronize the angular velocities of the idle gear wheel to be engaged and of the associated shaft, before the engagement operation is completed to transmit torque through the idle gear wheel in question. A synchronizing device typically comprises a driving part, rigidly connected for rotation by a splined coupling with the corresponding shaft of the gearbox; at least one synchronizing ring forming a conical surface which engages with a corresponding conical surface of the associated idle gear wheel; and a sleeve which is rigidly coupled for rotation with the driving part, and therefore to the corresponding shaft of the gearbox, and which can be moved axially in one or other direction by means of a corresponding engagement fork.

To enable the driver to control an ordinary mechanical gearbox sequentially, control devices for engaging the gears are known, which comprise a rotating drum placed parallel to the shafts of the gearbox and having on its outer cylindrical surface one or more guide grooves in which a plurality of pins engage slidably, each of these pins being rigidly connected for translation with a corresponding engagement fork of the gearbox. The rotation of the drum about its own axis is driven by a drive unit according to commands given by the driver through intermediate control devices. The drive group typically includes an electric motor or a servo-assisted hydraulic device, coupled to a reduction gear unit if necessary. The guide grooves of the drum are shaped so as to produce, as a result of the rotation of the drum, a selective movement of the pins and consequently of the engagement forks, according to predetermined operating modes, thus causing each time the engagement or disengagement of one or more gears.

A sequential control device with rotating drum for engaging the gears in a gearbox of a motor vehicle is known from DE 102 59 485 A1. According to a first embodiment, the control device comprises two synchronizing sleeves associated with a double engagement fork which is guided and supported directly on the drum. The engagement fork is provided with two pins, which engage slidably in a guide groove provided on the outer cylindrical surface of the drum, and which are located on opposite sides of the synchronizing sleeves with respect to the axis of the drum. Since the engagement fork is mounted directly on the drum, instead of on a suitable rod, the number of components of the control device can be reduced. On the other hand, the opposing arrangement of the control pins with respect to the synchronizing sleeves causes the engagement fork to be subject to high overturning torques during operation, and to tend therefore to become inclined with respect to a plane perpendicular to the axes of the drum and of the synchronizing sleeves. According to a second embodiment, the engagement fork is guided and supported on a guide rod, and the two pins are interposed between the axis of the drum and the axes of the synchronizing sleeves. In this case, the overturning torques acting on the engagement fork during operation are smaller, since the drive forces exchanged between the pins and the guide groove act with a lower lever arm. On the other hand, this second embodiment requires the mounting of the engagement fork on a special rod, and therefore requires an additional component as compared with the first embodiment.

GB 208 370 discloses a sequential control device for engaging gears in a mechanical gearbox of a motor vehicle, the device comprising: a drum mounted rotatably about an axis of rotation and having a plurality of guide grooves on its outer surface; and a corresponding plurality of engagement forks, each including a supporting portion supported slidably on the outer surface of the drum, a drive portion designed to shift a corresponding gear wheel of the gearbox, and a pin engaging in a corresponding guide groove of the drum. The guide grooves are shaped so as to produce, as a result of the rotation of the drum, a selective movement of the pins, together with the corresponding engagement forks, parallel to the axis of rotation of the drum to cause each time the engagement of a given gear. The pins are positioned, with respect to the axis of rotation of the drum, on the same side of the drive portion of the engagement forks.

SUMMARY OF THE INVENTION

An object of the present invention is to provide a sequential control device with rotating drum for engaging the gears in a gearbox of a motor vehicle, particularly of a motor car, which is composed of few components, which makes it possible to reduce the overturning torques acting on the engagement forks during operation and which can be manufactured easily and more precisely than according to the prior art.

This and other objects are fully achieved according to the invention by means of a sequential control device for engaging the gears in a mechanical gearbox of a motor vehicle, particularly of a motor car, comprising:
  a rotating drum having a plurality of guide grooves on its outer surface;
  a corresponding plurality of engagement forks, each including a support portion which is supported slidably on the outer surface of the drum and a corresponding pin which engages in a corresponding guide groove of the drum;
wherein the guide grooves are shaped so as to produce, as a result of the rotation of the drum, the selective movement of the pins and consequently of the associated engagement forks, according to predetermined operating modes, to cause each time the disengagement of the engaged gear and the engagement of a specified new gear;
wherein the pins are arranged on the same sides of the prongs of the engagement forks with respect to the axis of the drum, in other words on the same sides of the synchronizing sleeves controlled by the engagement forks; and
wherein a through groove is provided on the outer surface of the drum and extends parallel to the axis of rotation from an end of the drum to at least the guide groove farthest from that end, so as to guide the pins of the engagement forks when these latter are mounted on the drum.

The fact that the engagement forks are supported directly on the outer surface of the drum makes it possible to reduce the number of components of the control device, since no special support rod is required any more. At the same time, the fact that the pins are arranged on the same sides of the prongs of the engagement forks with respect to the axis of the drum makes it possible to reduce the overturning torques acting on the engagement forks during operation. Moreover, the provision of the through groove extending parallel to the axis of rotation of the drum makes it possible to mount the engagement forks on the drum simply by inserting the pins in the through groove from the open end of this latter and by making the pins to slide in the through groove until they reach the respective guide grooves.

In a variant embodiment, the control device also comprises an anti-rotation rod which is designed to prevent the rotation of the forks when under load about the axis of the drum during operation. Since it does not have any support function for the engagement forks, the anti-rotation rod can be of very small size and therefore does not significantly increase the overall dimensions of the control device.

BRIEF DESCRIPTION OF THE DRAWINGS

Further characteristics and advantages of the invention will be made clear by the following detailed description, provided purely by way of non-limiting example with reference to the attached drawings, in which.

DETAILED DESCRIPTION OF THE PREFERRED EMBODIMENTS

Figure 1:
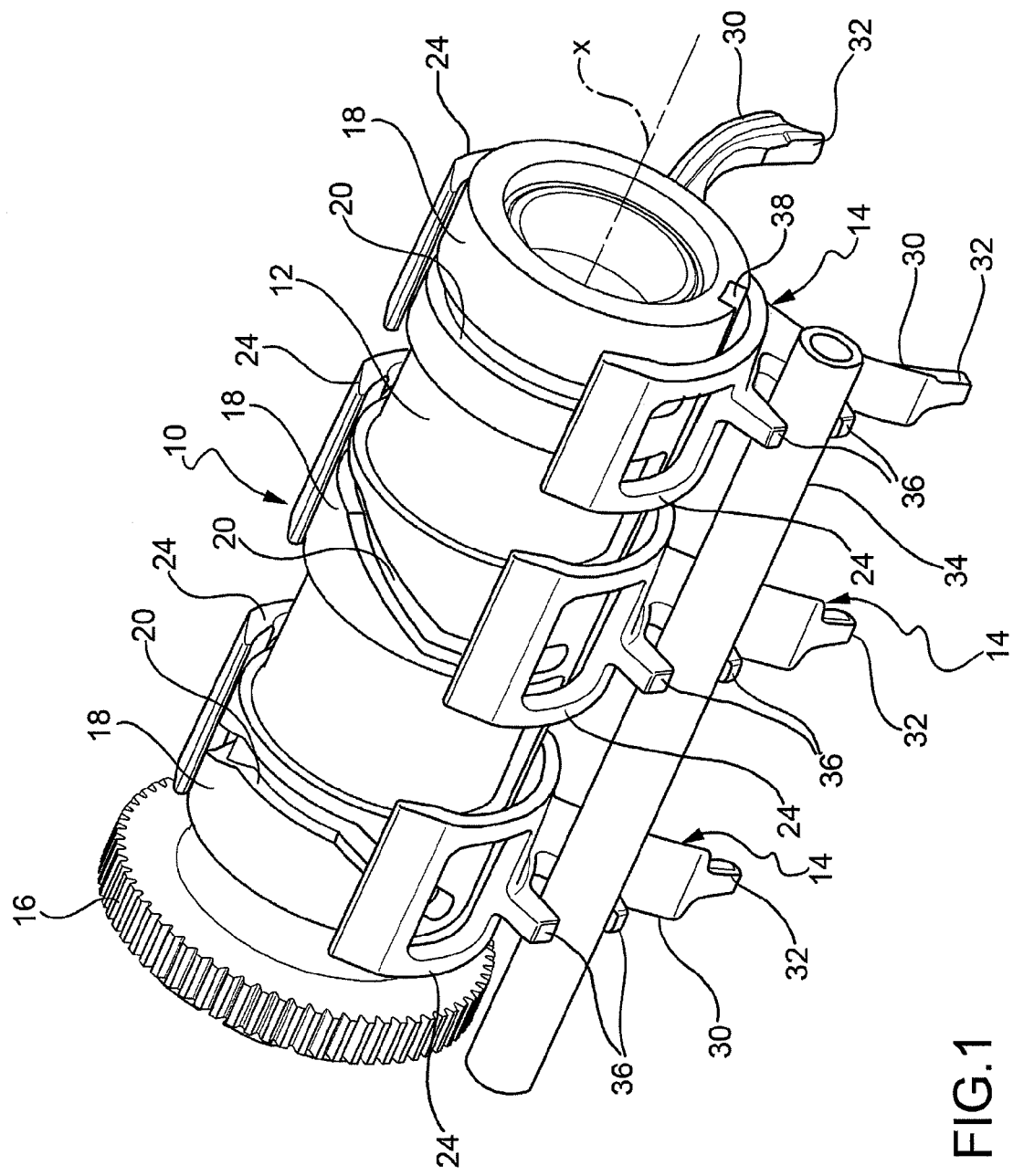
FIG. 1 is a perspective view of a sequential control device for engaging the gears in a mechanical gearbox of a motor car according to a preferred embodiment of the present invention.

With reference first to FIG. 1, a sequential control device for engaging the gears in a mechanical gearbox (not shown) of a motor car according to a preferred embodiment of the present invention is generally indicated 10.

The control device 10 basically comprises a drum 12, mounted rotatably about its own axis (indicated X in FIG. 1), and a plurality of engagement forks 14 supported on the drum 12 in such a way that they can slide axially, in other words parallel to the axis of rotation X of the drum. In the illustrated embodiment, the control device 10 is intended for a mechanical gearbox with five forward gears and one reverse gear, and therefore comprises three engagement forks 14, each of which is arranged to control the engagement of two gears. However, the invention is clearly applicable to control devices having any number of engagement forks.

In a known way (which is therefore not shown), the control device 10 additionally comprises drive means designed to rotate the drum 12 about the axis of rotation X in the appropriate direction and through the appropriate angle to cause the engagement of the desired gear. These drive means comprise, for example, an electric motor (or a servo-assisted hydraulic device) and if necessary a reduction gear unit whose output wheel (not shown) permanently meshes with a gear wheel 16 drivingly connected for rotation with the drum 12.

A respective annular supporting projection 18, formed in one piece with or firmly connected to the drum 12, is provided on the outer surface of the drum 12 for each engagement fork 14. A guide groove 20 is formed in each supporting projection 18, and a pin 22 fixed to a corresponding engagement fork 14 is guided in each guide groove. The interaction between the pins 22 of the engagement forks 14 and the guide grooves 20 of the drum 12 causes the rotary movement of the drum about the axis X to be converted into an axial translational movement of the pins 22, and consequently of the engagement forks 14, thus causing the gears to be engaged according to predetermined operating modes. For this purpose, the guide grooves 20 are shaped in such a way that, each time, a first pin 22 is moved in order to disengage the engaged gear, and a second pin 22 (which may be identical with the first) is moved in order to engage a new gear as a result of the rotation of the drum 12 through a given angle in one or other direction.

Figure 2:
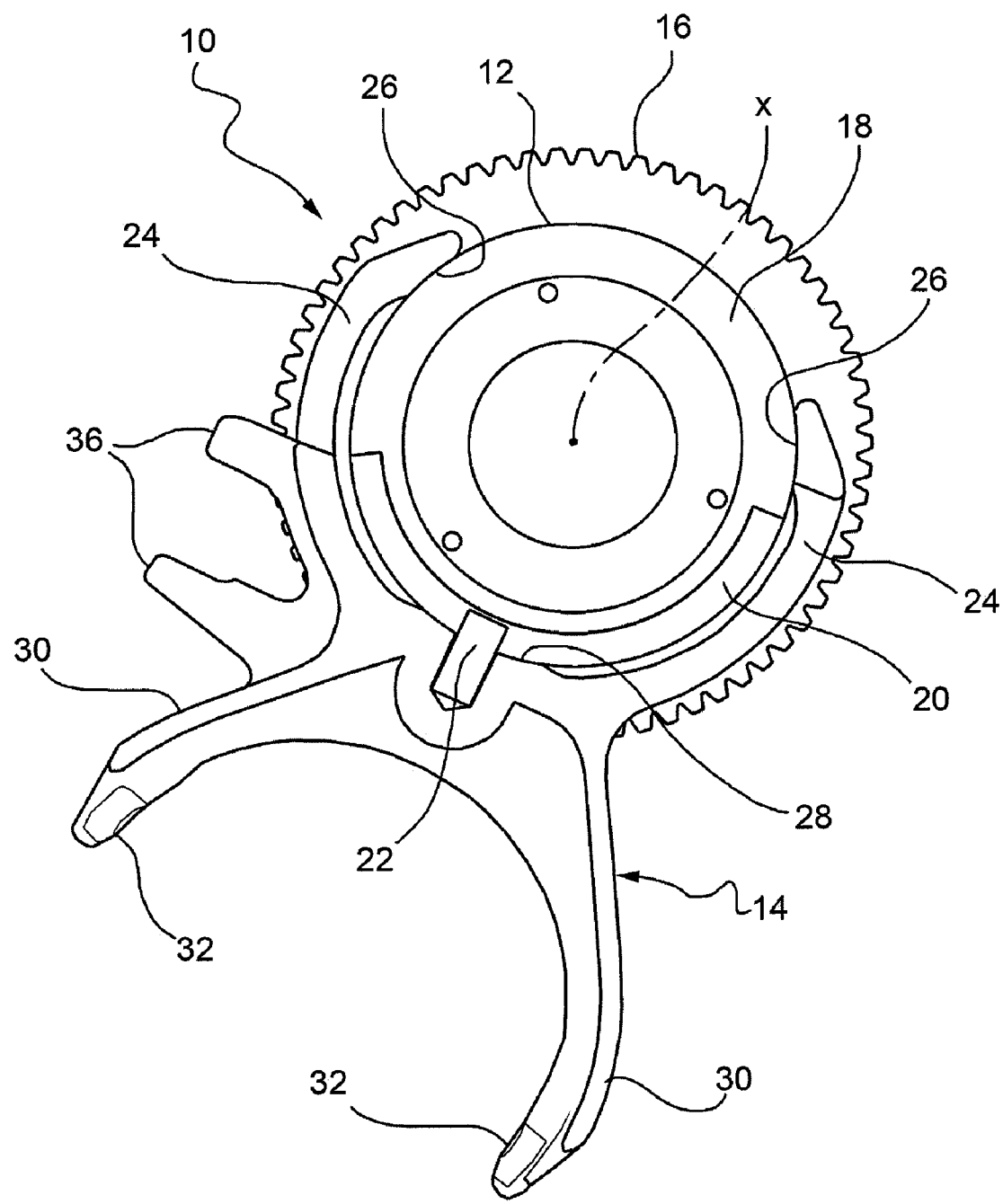
FIG. 2 is a side elevation of the control device of FIG. 1.
Figure 3:
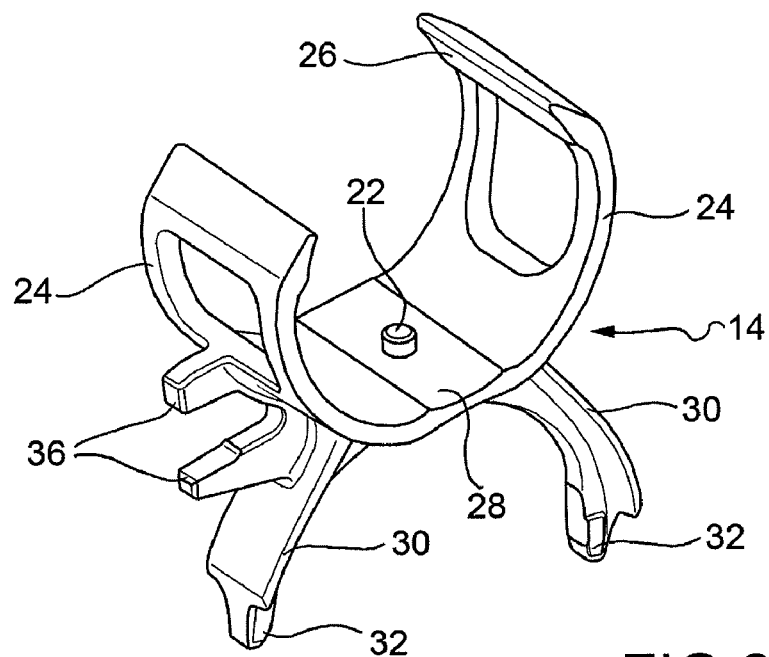
FIGS. 3 and 4 are, respectively, a perspective view and a side elevation of an engagement fork forming part of the control device of FIG. 1. In the following description and claims, the terms "axial" and "longitudinal" denote a direction parallel to the axis of rotation of the drum (i.e. parallel to the input and output shafts of the gearbox for which the control device is intended), while the terms "radial" and "transverse" denote any direction lying in a plane perpendicular to the axis of rotation of the drum.
Figure 4:
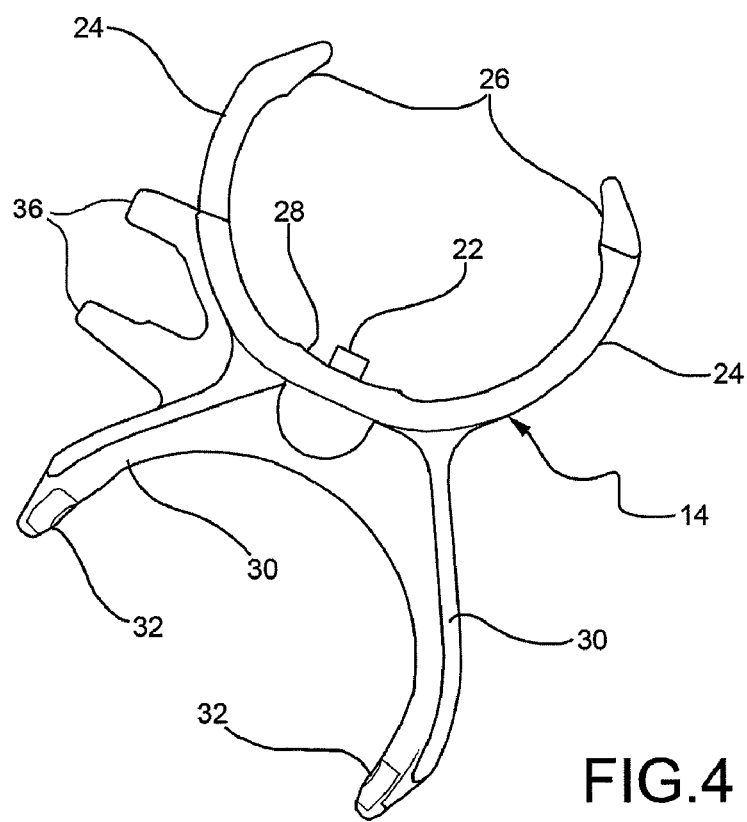

As can be better seen in FIGS. 3 and 4, each engagement fork 14 comprises a body which forms (advantageously in a single piece, as in the illustrated embodiment) a supporting portion (the upper portion as seen by a person looking at the drawings) and a drive portion (the lower portion as seen by a person looking at the drawings). The supporting portion includes a pair of curved arms 24 which extend from the centre of the body of the engagement fork 14 to beyond the axis of rotation X of the drum 12 (in other words, the angle subtended between the ends of the curved arms 24 is greater than 180°), and partially clasp the supporting projection 18 associated with the corresponding engagement fork, so as to be radially constrained to the drum. In particular, three contact areas are provided between the supporting portion of each engagement fork 14 and the corresponding supporting projection 18, these areas being located at the distal ends of the curved arms 24 (the areas indicated 26 in FIGS. 2 to 4) and at the centre of the fork body (the area indicated 28 in FIGS. 2 to 4), respectively. The drive portion includes a pair of prongs 30 which extend from opposite sides of the curved arms 24 with respect to the centre of the body of the engagement fork 14 and are provided at their distal ends with corresponding engagement fingers 32 designed to drive the associated synchronizing sleeve (not shown).

The engagement forks 14 are, for example, made from die-cast bronze, and are machined only in the areas of contact between the forks and the drum (areas 26 and 28) and between the fork and the synchronizing sleeves (the engagement fingers 32).

As can be clearly seen in FIGS. 2 and 3, the pin 22 is fixed to the engagement fork 14 in the contact area 28 in the centre of the supporting portion. More precisely, the pin 22 is positioned in the plane passing through the centre of the engagement fork 14 and the centre of the synchronizing sleeve. The pin 22 is therefore on the same side of the prongs 30 with respect to the axis of rotation X of the drum 12. In other words, the engagement fingers 32 at the ends of the prongs 30 are closer to the pin 22 than in the prior art described in the introductory part of the description. The forces exchanged between the engagement fingers 32 and the corresponding synchronizing sleeve, which tend to make the engagement fork 14 become inclined with respect to a plane perpendicular to the axis of rotation X of the drum, therefore act with a lower lever arm. This reduces the overturning torques acting on the engagement fork 14 during operation. Additionally, the engagement forks 14 are supported solely by the drum 12, without the need for a special guide rod. However, a rod 34 serving to prevent rotation may be provided, as in the embodiment shown in FIG. 1. The rod 34 extends parallel to the axis of rotation X of the drum 12 over a length substantially equal to the length of the drum, and may have a small diameter since it does not have any supporting function. In this case, each engagement fork 14 is provided with a pair of anti-rotation projections 36 which extend laterally from the centre of the body of the fork and which engage the rod 34 from diametrically opposite sides so as to prevent any rotation of the fork about the axis of rotation X of the drum 12.

Finally, as shown in FIG. 1, a through groove 38 is provided on the outer surface of the drum 12, which groove opens to an end of the drum (the right-hand end according to FIG. 1) and extends parallel to the axis X of the drum from that end to at least the guide groove 20 farthest from that end. The through groove 38 may also extend from an end of the drum 12 to the opposite end, i.e. throughout the longitudinal extension of the drum. The through groove 38 serves for the initial mounting of the engagement forks 14 on the drum 12. The engagement forks 14 are in fact axially fitted onto the drum 12 by causing the corresponding pins 22 to enter the groove 38 through the open end thereof and then to slide along the groove 38 until they reach the respective guide grooves 20. After that, the engagement forks 14 are rotated about the axis X of the drum 12 until they reach the initial position, in which all the synchronizing units are simultaneously in the idle position. The drum 12 and the engagement forks 14 can therefore be easily and precisely produced as preassembled sub-units.

Naturally, the principle of the invention remaining unchanged, the embodiments and the details of construction can vary widely from those described and illustrated purely by way of non-limiting example.

What is claimed is:

1. A sequential control device for engaging gears in a mechanical gearbox of a motor vehicle, the device comprising:
    at least one drum mounted rotatably about an axis of rotation and having a plurality of guide grooves on an outer surface of the drum;
    a corresponding plurality of engagement forks, each including a supporting portion supported slidably on the outer surface of the drum, a drive portion configured to drive a corresponding synchronizing sleeve of the gearbox, and a pin engaging in a corresponding one of the plurality of guide grooves of the drum;
    wherein the guide grooves are shaped so as to produce, as a result of the rotation of the drum, a selective movement of the pins, together with the corresponding engagement forks, parallel to the axis of rotation of the drum according to predetermined operating modes, to cause each time the engagement of a given gear,
    wherein the pins are positioned, with respect to the axis of rotation of the drum, on the same side of the drive portion of the engagement forks;
    wherein a through groove is provided on the outer surface of the drum and extends parallel to the axis of rotation from an end of the drum to at least one of the plurality of guide grooves that is farthest from that end, so as to guide the pins of the engagement forks during mounting of the engagement forks on the drum.

2. Device according to claim 1, wherein the supporting portion of each engagement fork includes a pair of curved arms which extend from the center of the engagement fork through an angle of more than 180° and partially clasp the outer surface of the drum so as to be radially constrained to the drum.

3. Device according to claim 1, wherein the drive portion of each engagement fork includes a pair of prongs which extend from opposite sides of the supporting portion with respect to the center of the engagement fork and are provided at their distal ends with corresponding engagement fingers designed to drive the associated synchronizing sleeve.

4. Device according to claim 1, wherein the engagement forks are made from die-cast bronze and are machined only in the areas of contact with the drum and with the corresponding synchronizing sleeves.

5. Device according to claim 1, additionally comprising a rod extending parallel to the axis of rotation of the drum, each of the engagement forks being provided with anti-rotation means cooperating with the rod so as to prevent the engagement forks from rotating about the axis of rotation of the drum.

* * * * *